July 27, 1954 T. H. BARNES ET AL 2,685,003
ELECTRICAL PICKUP AND GUIDE FOR AMUSEMENT APPARATUS
Filed June 9, 1949 4 Sheets-Sheet 1
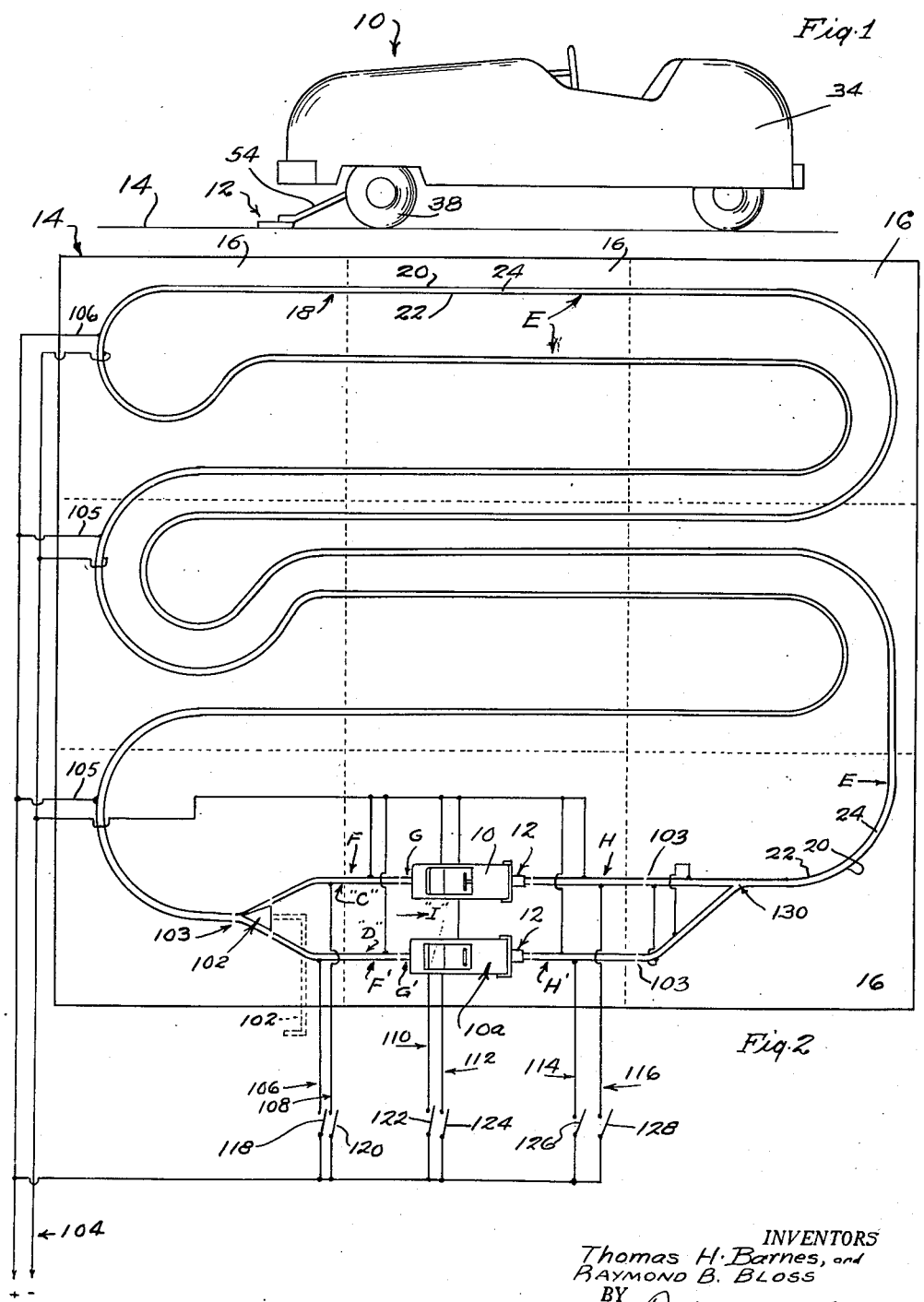
INVENTORS
Thomas H. Barnes, and
Raymond B. Bloss
BY
Their Atty INVENTORS
Thomas H. Barnes, and
Raymond B. Bloss
BY
Their Atty

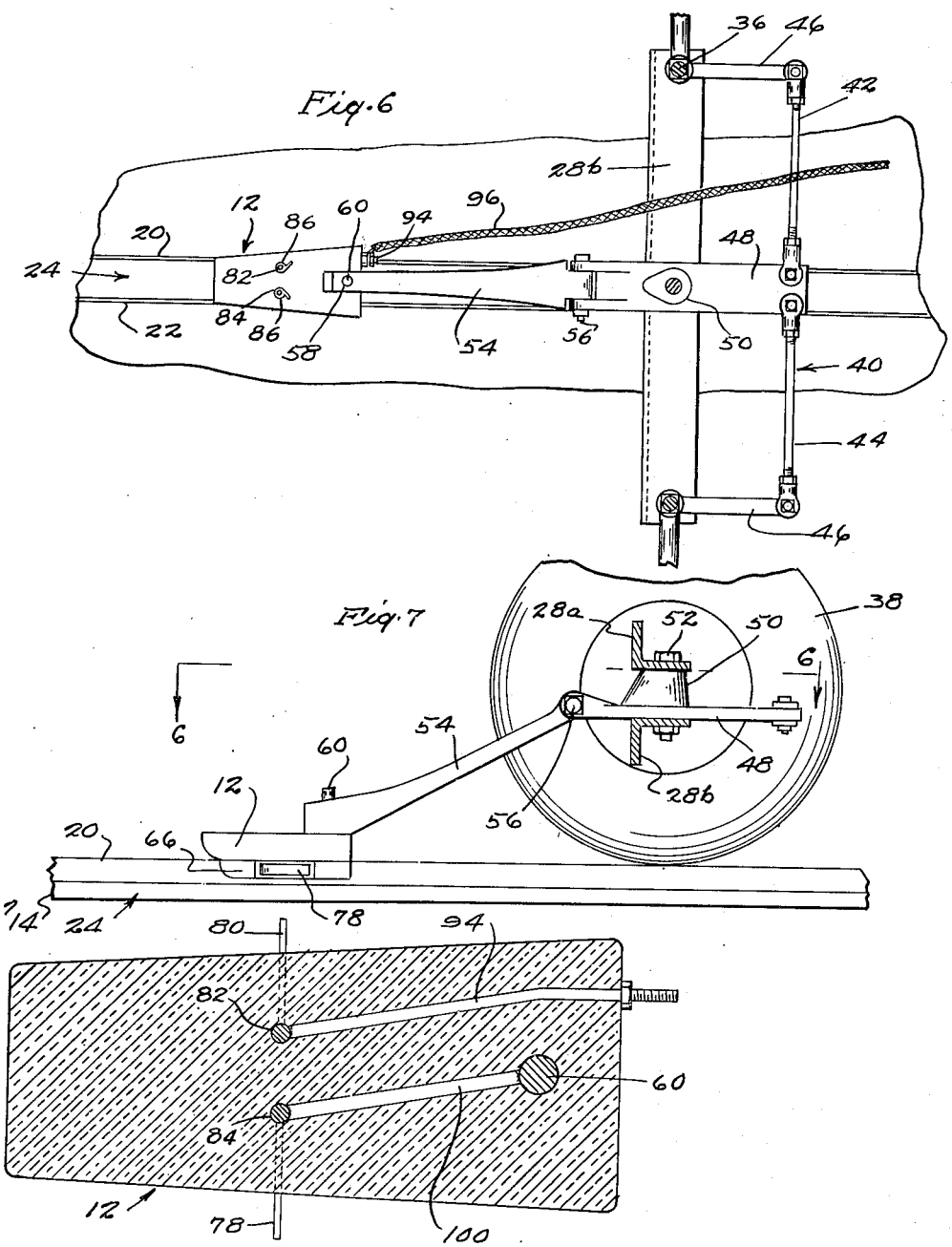

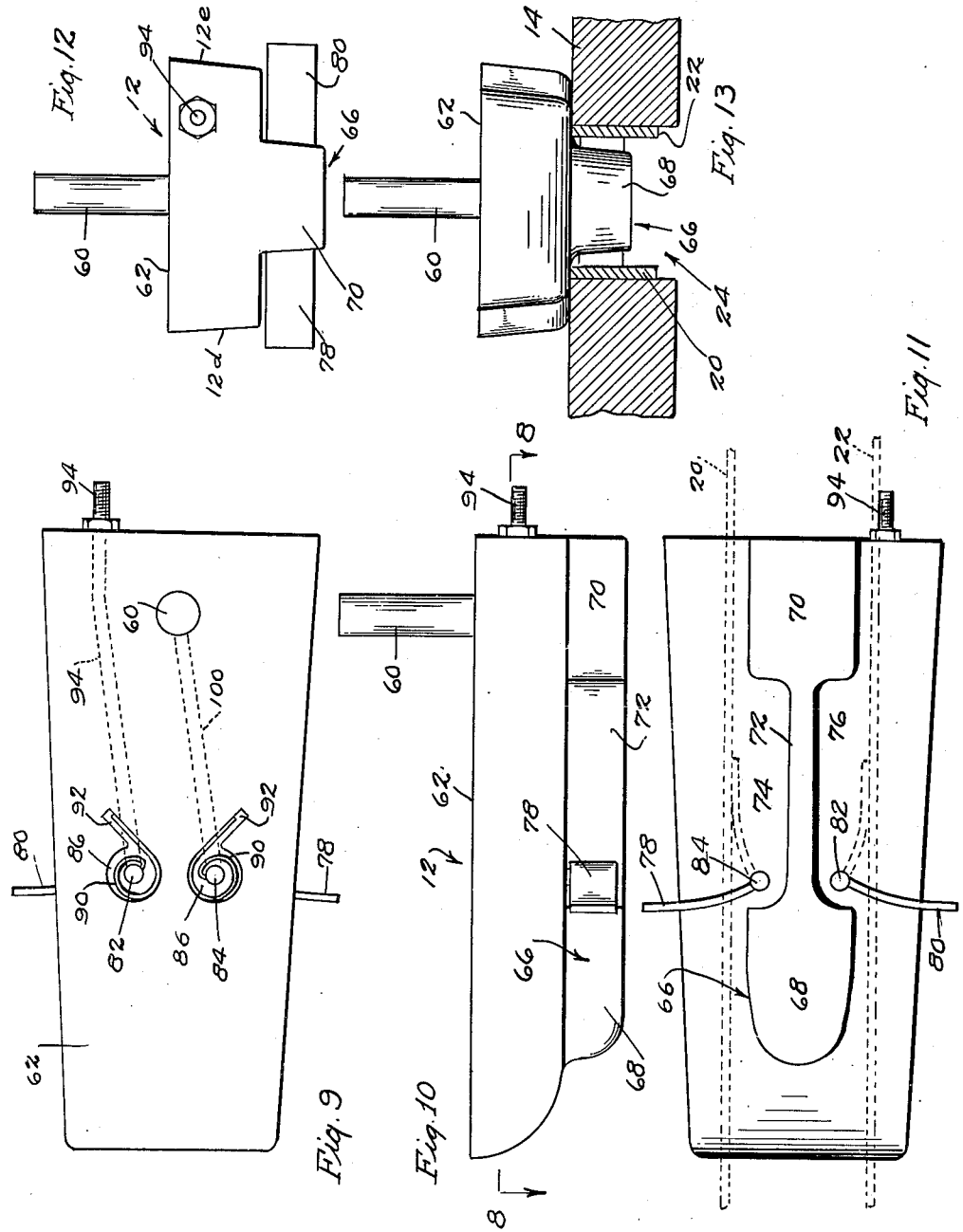

Patented July 27, 1954

2,685,003

UNITED STATES PATENT OFFICE 2,685,003

ELECTRICAL PICKUP AND GUIDE FOR AMUSEMENT APPARATUS

Thomas H. Barnes and Raymond B. Bloss, Burbank, Calif.

Application June 9, 1949, Serial No. 98,136

8 Claims. (Cl. 191—48)

1

The present invention relates in general to amusement apparatus of the type installed in play-grounds, carnivals, fairs and similar places having facilities for entertaining and for the pleasure of large numbers of people, and relates in particular to facilities adapted to pick-up electrical energy for the operation of child-size automobiles which move circuitously along a pre-arranged course of travel comprising the electrical circuit for the pick-up, and incorporates in combination with the pick-up, means whereby the vehicle is automatically guided along the electrical circuit used by the pick-up, aforementioned, and this statement is to be considered as being the principal object of the invention.

Another object of the invention is to provide a pilot which is adapted to slidably follow an imbedded electrical circuit, and having slip fingers in electrical contact with said circuit whereby electrical energy can be conducted to a point of use, and which pilot is adapted to directionally operate a leverage linkage whereby a miniature automobile may be caused to follow the electrical circuit from and to a point of beginning.

Another object of the invention is to provide a novel design for a course of travel for a miniature vehicle of the character contemplated, wherein the course of travel is delineated by and comprises an electrical circuit which is the power source for operating the vehicle, in combination with means adapted to follow said electrical circuit and to translate deviations thereof into a course of travel for the vehicle.

A further object of the invention is to provide a portable base or platform of detachable segments of the whole, and which platform, including the segments thereof, is slotted to receive an electrical circuit therein, and which electrical circuit is definitive of the course of travel for miniature automobiles adapted to functionally operate thereupon, including means in combination with said slotted platform and said vehicle, to guide the vehicle along said electrical circuit.

A still further object of the invention is to provide a safe, yet novel and attractive, electrically driven miniature automobile for children, incorporating means in combination with an electric circuit in the platform and in the vehicle whereby the vehicle is guided circuitously over the platform from and returning to a point of beginning.

Other objects, features and advantages of the invention may be noted from the accompanying drawing, the detailed specification and the subjoined claims.

Figure 1 is a side-elevational view of the type of miniature automobile used in conjunction with the electrical pick-up and guide of this invention; while, Figure 2 is a top plan view of the platform upon which the vehicle (s) is adapted to travel, the circuitous, although parallel lines indicate the electrical circuit for operating the vehicle, while the intervening space therebetween is adapted to receive the guide-shoe.

Figure 3 is a top plan view of a chassis for a miniature automobile showing the pick-up and guide operatively positioned thereon; while.

Figure 6 is a view similar to a portion of Figure 3, but is drawn to a larger scale to better illustrate the construction; while, Figure 7 is a side-elevational view thereof.

Figure 8 is a sectional view taken along line 8—8, Figure 10, and is adapted to show the positioning of the electrical circuit through the body of the guide.

Figure 9 is a top-plan view of the guide per se; and,

Figure 10 is a side-elevational view thereof; while,

Figure 11 is a bottom plan view of the same.

Figure 12 is a rear-elevational view of the guide; and

Figure 13 is a front elevational view thereof.

Figure 3:
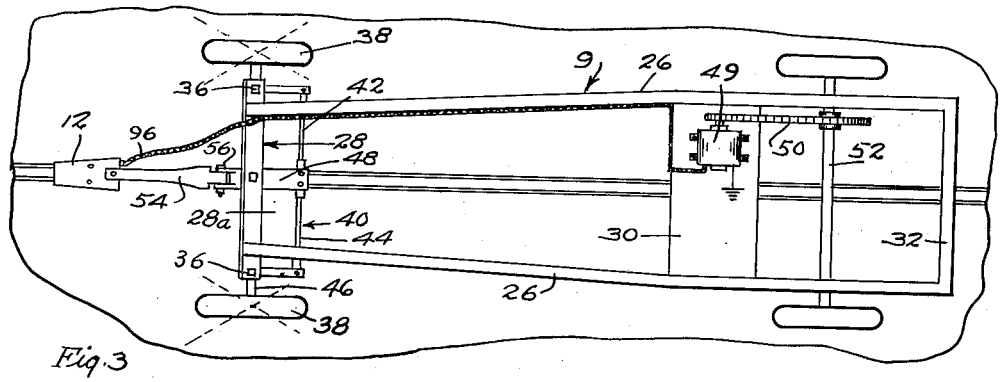

In the drawing, the reference character 10 indicates a miniature automobile type of car adapted to be used in combination with the electrical pick-up and guiding shoe 12 of this invention, for operation and use upon the platform base 14, as will hereinafter be set forth.

The base 14 is preferably formed of panels 16 to facilitate assembly and dis-assembly for moving from one location to another, however, for permanent installations, the base or platform may be formed as a unitary structure, but regardless of the mode of fabrication, an electrical circuit 18 which is formed of spaced, parallel strips or rails 20 and 22 of brass or copper, or other electrical conductor, are placed to lie within and against the sides of a groove or slot 24 within the platform. The drawing shows one form of circuitous layout for the electrical circuit which is at once, a power source for the vehicle 10, and a course of travel therefor. The layout shown is adapted to give a maximum length of travel for a platform of limited area, other configurations for the electrical circuit may be used to meet the physical limitations of the area available for use.

Figure 4:
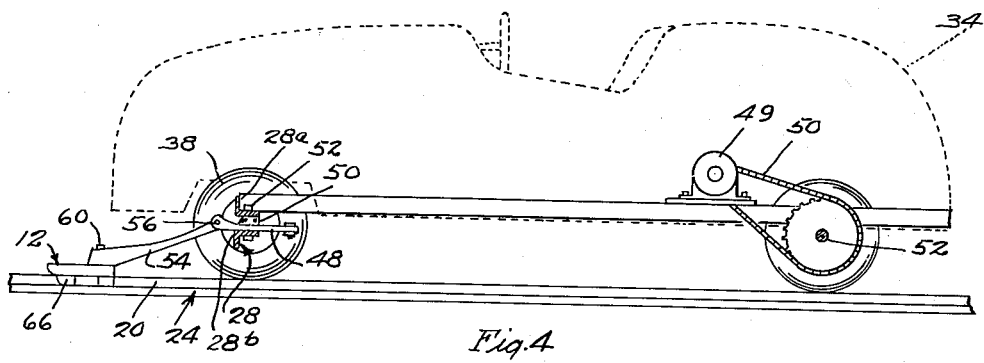
Figure 4 is a side-elevational view thereof, the dotted lines merely indicating the outline of the body of the vehicle.
Figure 5:
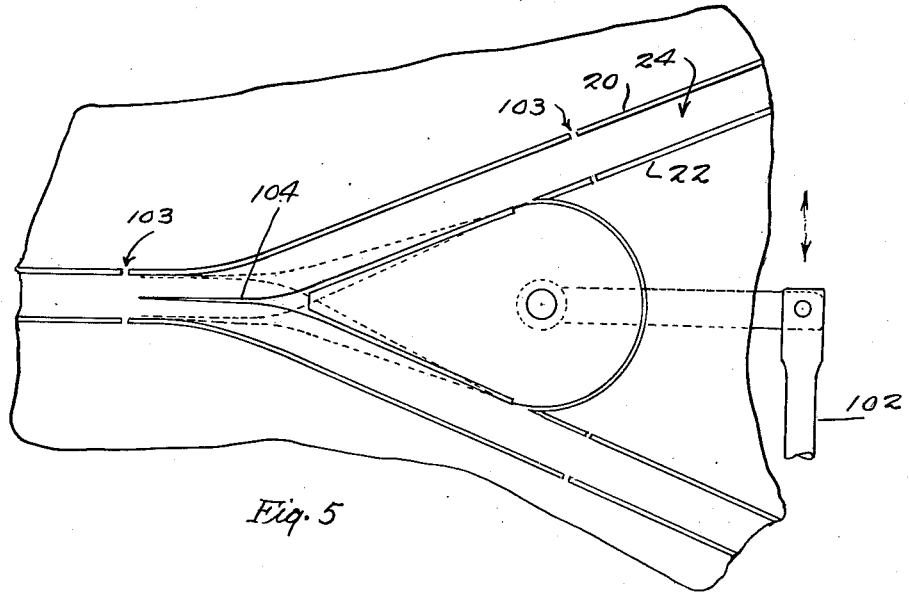
Figure 5 is a view showing one form of switch adapted to direct the guide from one to another given line of travel.

In Figures 3 and 4, we show a chassis 9 having side rails 26, together with such cross pieces 28, 30 and 32, as may be needed to make a rigid structure, upon which the body 34 is placed for use. The front cross piece 28 is formed of two angle irons 28a and 28b which are placed back to back and are fixedly secured in spaced relationship with respect to one another so as to accommodate a king-pin 36 for each of the front wheels 38 and for attachment of a tie-rod 40 for steering the car, the tie-rod being formed of the adjustable rods 42 and 44 which are attached to the arms 46 of the king-pin and to a lever 48 which is swingably positioned medially of the length of, and between the angle irons 28a and 28b, and which lever constitutes a portion of the steering apparatus of the vehicle.

The structural element 30, which may be a plate, is adapted to support an electric motor 49 having an appropriate drive 50 which is operatively connected to the axle shaft 52 of the vehicle.

The lever 48, as shown particularly in Figure 7, is formed with a boss 50 which serves the purpose of a spacer, so that the lever is held against tilting movement between the parts 28a and 28b. A bolt 52 extending through the parts, provides a pivot point therefor and enables the lever to swing laterally in response to directional movement of the shoe 12, for manipulation of the tie-rod and steering of the front wheels of the car.

The front end of the lever 48 is bifurcated to hingedly receive the inner end of a link 54 which is fulcrumed upon a pin 56 which extends therethrough. The foreward end of the link 54 is provided with a vertically disposed bore 58 to receive a coupling pin 60 which is moulded in the guide shoe 12 as an integral element thereof.

The shoe 12 is formed of a dielectric material which is not susceptible of rapid abrading. Certain of the plastics, such as urea, or melamine formaldehyde, or vitrifiable material, are usable in the casting thereof. The body of the shoe is substantially rectilinear in top-plan and in side elevation, and is formed with a fin 66 upon the under surface thereof for loose fitting in the groove 24 and between the rails 20 and 22 of the electrical circuit 18 so that in effect there are formed shoulders 12d and 12e which extend laterally of the longitudinal axis of the shoe overhanging the central body thereof which shoulders support the shoe over the groove 24 within which the conductor rails 20 and 22 are positioned.

As previously mentioned, the fin 66 is positioned upon the medial longitudinal center of the bottom face of the shoe 12, and is divided into front and rear portions 68 and 70 which are in end connection by a relatively narrow rib 72, thereby forming pockets 74 and 76 which are adapted to accommodate the spring pressed fingers 78 and 80 for electrical contact with the rail 20 and 22. The fingers are supported upon pins 82 and 84 which extend through the body 62 of the shoe, and terminate in recesses 86 upon the top surface thereof. Springs 90 are attached to the pins and lie within the recesses with their free end terminal in lateral slots 92 extending therefrom, and are adapted to yieldably hold the fingers 78 and 80 at substantially right angles to the sides of the shoe, so that when repressed to lie between the rails as shown in dotted lines in Figure 11, the fingers will be in good electrical, although sliding contact therewith.

The pin 82 of finger 80 is electrically connected to a conductor 94 which is moulded in the shoe and is adapted to connection with a lead 96 which extends along the chassis 9 to the motor 49 of the vehicle, while the pin 84 of finger 78 is provided with a similarly disposed conductor 100 for the coupling pin 60, upon which the link 54 is positioned. Since the link 54 is in continuous mechanical connection with the chassis 9, it is adapted to, and does serve the purpose of a grounded return for energy impressed across the rails 20 and 22.

The electrical circuit 18, as laid out in Figure 2, includes a loading and unloading sector represented by the parallel rail sections C and D, from which the direction of departure is indicated by the arrow I.

Each of the ends of the sectors C and D are electrically disconnected from the outer portion E by an air gap 103, or other means, and the sectors C and D are divided into electrically separated divisions F, G, H, and F', G' and H'.

The outer portion of the circuit 18, or portion E thereof, is connected in parallel with a power source through the main service line 104, and feeder lines 105, of which there may be as many as are necessary to maintain a constant voltage across the rails 20 and 22. Each division of the sectors C and D is in parallel with the service line 104 through the feeder lines 106, 108, 110, 112, 114 and 116, and which feeder lines include the manually operated switches 118, 120, 122, 124, 126 and 128, thus the sectors C and D may be energized in whole or part, as desired. If a car 10a is to make more than one trip around the circuit 18, then the switches 118, 122 and 126 are closed, and the directional switch 102 is moved by means of the manually operated lever 102, to provide an uninterrupted channel between the rails 20 and 22, so that the pilot pick-up shoe will move uninterruptedly from the outer portion E, through each of the divisions F', G' and H', and thence through the junction 130 to the outer portion E for repetitious movement, or alternatively, if a car is to unload, it may be spotted upon any of the divisions of either sector, by operating the directional switch 102 and de-energizing the circuit to the division or divisions of the sectors upon which the car is to be spotted.

The description herein given with respect to the electrical feeder circuits and the controls therefor, is merely illustrative of one method by which the cars can be moved to and from the main portion E of the circuit 18 for loading and unloading, and is not to be considered as being critical to the invention, the invention being held to lie in the relationship between the rails 20 and 22 which are so spaced and supported in the platform 14 as to form an open channel 24 through which the pilot pick-up shoe is adapted to move in electrical contact therewith, and which pilot pick-up shoe and the steering apparatus connected thereto, is adapted to translate the inclination of the rails 20 and 22 into a course of travel for the car 10.

Experience has shown that the shoe 12 is reliable and efficient in operation, in that, it unfailingly follows the groove or slot 24 between the rails which comprise the circuit for the car, that it unfailingly swings the steering linkage to cause the car to follow its power source, and that the fingers 78 and 80 of the shoe make efficient contact with the rails so that the flow of low voltage energy to the motor is constant, yet the pressure of the fingers upon the rails is not sufficiently great to cause abnormal wear and waste thereof.

The construction herein shown and described, gives a child a ride which is comparable with that derived from a self-driven vehicle, since there are no visible elements of the construction which impart a sense of restraint, such as is found in other power driven vehicles of the class concerned with herein.

Having thus described our invention, that which we believe to be new, and hence novel, and for which we seek Letters Patent, is as follows.

We claim:

1. An electric current pick-up and guide for apparatus of the character described comprising a moulded dielectric body substantially of rectilinear form having a longitudinally disposed fin on the under-side thereof so as to create shoulders upon each side of the fin, a spring pressed pivotally positioned finger extending pendently from said shoulders adjacent each side of said fin and adapted to be repressed to lie substantially parallel therewith when in functional use, and leads, said leads being imbedded in said dielectric body and connected with said fingers and to terminals extending from said body.

2. An electric current pick-up and guide for apparatus of the character described comprising, a moulded dielectric body having a recessed rib positioned upon the medial longitudinal center of the bottom face thereof, a spring actuated finger upon said body and upon each of the sides of said rib, said fingers being adapted to be repressed in functional use to lie substantially parallel with said rib, and leads, said leads being imbedded in said dielectric body and connected with said fingers and to terminals extending from said body, one of said terminals being a binding post.

3. An electric current pick-up and guide-shoe for apparatus of the characted described comprising, a moulded dielectric body having a recessed rib positioned upon the medial longitudinal center of the bottom face thereof, a spring actuated finger extending downwardly from the dielectric body adjacent one of the ends of the recesses in said rib and adapted to be repressed in functional use to lie substantially parallel with and over the sides of said recesses, and leads, said leads being imbedded in said dielectric body and connected with said fingers and to terminals extending from said body, one of said terminals being a pivot pin positioned and arranged for swivel connection with a guide apparatus on a vehicle.

4. An electric current pick-up and guide-shoe for miniature cars of the character described comprising, a moulded dielectric body having a rib positioned upon the medial longitudinal center of the bottom face thereof, spring pressed fingers extending from said body and outwardly of the sides of said rib and being adapted to be repressed in functional use to lie substantially parallel with said rib, and leads, said leads being imbedded in said dielectric body and connected to said fingers and to terminals projecting from said body, one of said terminals being a pivot pin positioned and arranged for swivel connection with a guide apparatus on a vehicle and the other of said terminals being a binding post.

5. As a course of travel guide and an electrical power pick-up for a vehicle operable along a circuitous course upon a base surface having an electrical circuit comprising spaced conductors recessed therein, in combination, a moulded dielectric body having oppositely disposed sides forming shoulders adapted to extend over and beyond the conductors comprising said recessed circuit and having a rib positioned upon the medial longitudinal center of the bottom face of the dielectric body and having end portions of a width adapted to substantially occupy the spacing between the conductors of said recessed circuit, a spring pressed finger pivotally positioned adjacent each side of said rib and dependent from said shoulders so as to yieldingly engage said conductors, and leads, said leads being imbedded in said dielectric body, one of said leads being connected to a finger and to a terminal binding post moulded in said dielectric body, the other of said leads being connected to the other of said fingers and to a coupling pin moulded in said dielectric body, the forward face of said dielectric body including the rib thereon being contoured in avoidance of obtuseness whereby said guide and power pick-up is adapted to slide over minor misaligned sections of said electrical conductors upon forward movement of said vehicle.

6. The combination in a device adapted and arranged to precede a vehicle in functional use along a recessed electrical circuit comprising spaced conductors, of a monolithic dielectric body having horizontal shoulders adapted to support said device across said electrical circuit and a medial longitudinally disposed concaved rib upon the under-side of said body adapted to slidable contact with said electrical conductors for aligning the device with respect thereto, circuit contact fingers extending pendently from said body, spring means arranged to urge said fingers into resilient pressure contact with said circuit when in use, and leads, one of said leads connecting one of said fingers and a binding post on said body and the other of said leads connecting the other of said fingers and a swivel pin fixedly secured in said body.

7. As an element of an electrical circuit including a pair of spaced conductors, which element has a lead grounded through a motive chassis, a collector shoe said collector shoe comprising a monolithic cast dielectric body having oppositely disposed horizontal shoulders adapted to support said shoe across said circuit and having a medial longitudinally aligned depended concaved rib adapted to rest between the conductors of said circuit in sliding contact therewith, fingers on said body on each side of said rib arranged to contact said conductors and leads, one of said leads connecting one of said fingers and a binding post on said body, and the other of said leads connecting the other of said fingers and a vertically disposed fixedly positioned coupling pin on said body, said coupling pin being adapted to be in swivel union with a vehicular tongue whereby the related conductor of said circuit is grounded to said vehicle.

8. As an element of an electrical circuit, including a pair of spaced conductors, which element has a lead grounded through a motive chassis, a collector shoe, said collector shoe being formed as a cast dielectric body having substantially a rectangular form having an upwardly curved foreward end and a dependent rib upon the lower medial longitudinal surface thereof, said rib being formed with a cavity in each of its sides intermediate its ends, fingers dependent with respect to said body positioned within said cavities for shielding thereof against impact, yieldable means adapted to urge said fingers outwardly in wiping contact with the conductors of said circuit, and leads, one of said leads connecting one of said fingers and a binding post on said body, and the other of said leads connecting the other of said fingers and a vertically disposed fixedly positioned coupling pin on said body, said pin being adapted to be in swivel union with a vehicular tongue whereby the related leg of said circuit is carried to said vehicle.

References Cited in the file of this patent

UNITED STATES PATENTS

| Number | Name | Date |
|---|---|---|
| 305,731 | Knight | Sept. 23, 1884 |
| 1,140,094 | Yurow | May 18, 1915 |
| 1,606,691 | Boyer | Nov. 9, 1926 |
| 1,613,866 | Avery | Jan. 11, 1927 |
| 2,461,696 | Morningstar | Feb. 15, 1940 |

FOREIGN PATENTS

| Number | Country | Date |
|---|---|---|
| 11,540 | Great Britain | May 15, 1909 |